Sept. 22, 1936.   W. S. GULLETTE ET AL   2,055,452
FURNACE
Filed May 24, 1934   2 Sheets-Sheet 2

INVENTORS
WILLIS S. GULLETTE
THOMAS B. KIMBALL
BY
ATTORNEY

Patented Sept. 22, 1936

2,055,452

UNITED STATES PATENT OFFICE 2,055,452

FURNACE

Willis S. Gullette, Highland, and Thomas B. Kimball, Hammond, Ind., assignors to The Texas Company, New York, N. Y., a corporation of Delaware Application May 24, 1934, Serial No. 727,224

2 Claims. (Cl. 196—116)

This invention relates in general to furnaces and more especially to an improved vertical tube furnace for heating hydrocarbon fluids.

In furnaces for heating hydrocarbon fluids it is desirable to avoid temperature differentials between various parts of individual heat absorbing tubes as the hydrocarbon fluid passing through any particular tube would otherwise absorb heat at an uneven rate. In vertical tube furnaces of the type illustrated it has been found that under some conditions of operation the heat distribution over the entire tube surface was not uniform. Uneven heat distribution over tube surfaces results in inefficient operation in that the entire tube surface is not being utilized to the fullest extent which necessitates, among other things, the provision of additional tube surface to accomplish the desired heating of the hydrocarbon fluid.

This invention provides a furnace which obviates the disadvantages heretofore encountered due to temperature differentials, especially such as has been encountered in vertical tube furnaces of the type herein illustrated. In the preferred embodiment of this invention, there is provided a vertical cylindrical combustion chamber having heat absorbing tubes evenly spaced from the center thereof to form a tube circle. A suitable burner arrangement is provided at one end of the furnace, and in the furnace illustrated at the top thereof, for producing hot products of combustion for passage through the cylindrical combustion chamber. A heat radiating and deflecting means, such as a refractory cone, is positioned at the opposite end of the combustion chamber and extends therein in a direction directly in the path of the hot products of combustion to absorb heat therefrom and radiate absorbed heat, as well as deflect the combustion gases, toward that portion of the individual tubes surrounding the heat radiating and deflecting means. Other means such as a skirt surrounding the base of the cone extends transversely to the heat radiating and deflecting means and abruptly changes the flow of the hot gases to direct them into intimate contact with that portion of the individual heat absorbing tubes surrounding the skirt. It will thus be evident that a portion of the tubes normally receiving a deficiency of heat is thus subjected to additional heat, this additional heat comprising that radiated from and deflected by the refractory cone and that obtained by intimate contact with the combustion products abruptly deflected by the refractory skirt associated with the refractory cone. A furnace constructed in accordance with this invention provides for even heat distribution over the entire tube surface, this uniform heating obviating the disadvantages heretofore encountered under certain operating conditions by a large difference in heat absorption rate between different portions of the tubes.

In order to make the invention more clearly understood, there is shown in the accompanying drawings, means for carrying the same into practical effect without limiting the improvements in their useful applications to the particular constructions, which for the purpose of explanation, have been made the subject of illustration.

Figure 1:
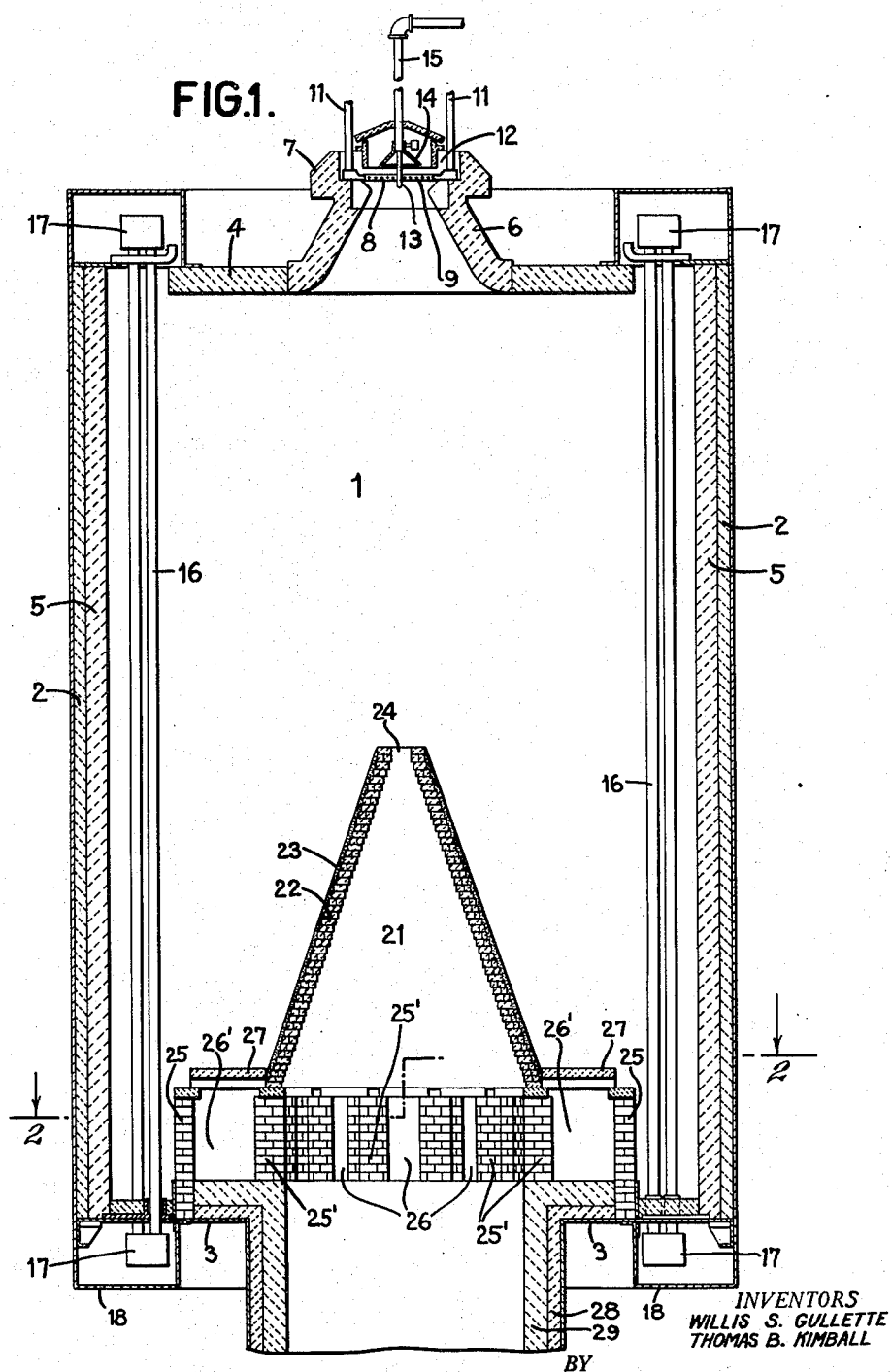
Figure 1 is an elevational view, partly in section, of a furnace constructed in accordance with the invention.

Referring to the drawings wherein the same characters designate like parts and more particularly to Figure 1, there is shown a furnace structure having a combustion chamber 1 defined by refractory side walls 2, bottom walls 3 and top walls 4. The combustion chamber 1 may be lined along its side walls 2 and bottom walls 3 with a suitable refractory lining 5 in order to protect the side and bottom walls from excessive heat. While it is generally unnecessary to provide a lining for the top wall 4 in a furnace of the type illustrated, it is to be clearly understood that such a lining may be employed.

In the furnace illustrated, the hot products of combustion are produced in the upper portion thereof and directed downwardly through the combustion chamber. As shown, a refractory throat 6 extends from the top walls 4 of the combustion chamber, this throat having an extension 7 for receiving a suitable burner arrangement. The burner arrangement may comprise a burner ring 8 having a plurality of apertures 9 placed therearound for the purpose of discharging fuel to be burned and air into the throat. The fuel for the burner, which may be gas, or any other suitable fuel, may be introduced through fuel lines 11 suitably connected to the burner ring 8. Air for aiding combustion, preheated if desired, may be introduced through a passage 12 into the burner arrangement. The burner arrangement illustrated may also include an auxiliary burner 13 extending through the center of the burner ring 8 for the purpose of introducing additional fuel to be burned, and under greater pressure, into the throat 6 to thereby drive the flame farther down into the combustion chamber. The auxiliary burner 13 may be provided with a shield 14 positioned above the ring burner 8 to deflect air towards the burner ring. The burner 13 may be connected to a suitable source of supply by a pipe 15, any suitable fuel, such as gas or oil, being passed through the pipe 15 to the auxiliary burner 13.

It will thus be seen that by providing an auxiliary burner 13 it is possible to force the flame formed within the throat 6 farther downwardly within the combustion chamber. If desired, the auxiliary burner 13 may be dispensed with and equivalent results obtained by carrying a higher pressure on the burner ring 8 by plugging up some of the apertures 9. In this manner the flame is driven downwardly to a greater extent than without the apertures being plugged up and satisfactory furnace performance thus obtained.

The combustion chamber 1 is provided with a plurality of vertical heat absorbing tubes 16 extending through the bottom 3 and top 4 of the combustion chamber and connected by suitable return bends 17 on the outside of the combustion chamber. The return bends 17 may be encased in a suitable housing 18, having a removable cover, to prevent heat loss from the fluid passing through the return bends.

In down-shot furnaces of the type illustrated experience has indicated that under certain operating conditions a large temperature differential existed between the upper and lower parts of the heat absorbing tubes 16. This uneven heat distribution over the entire tube surface may be due in part to the cooling of the hot products of combustion in their passage downwardly through the combustion chamber and also to the tendency of hot gases to rise. These factors tend to cause the upper portion of the vertical tubes 16 to be subjected to a more intense heat than the lower portion of these tubes thereby obtaining uneven heat distribution over the entire tube surface. In accordance with this invention, the uneven heat distribution over the entire tube surface is obviated and furnaces constructed in accordance therewith have definitely demonstrated the feasibility of evenly distributing the heat over the entire tube surface.

A heat radiating and deflecting structure, indicated generally by the numeral 21, may be provided in the lower part of the furnace chamber directly in the path of the hot products of combustion produced in the upper portion of the combustion chamber by the burner arrangement. The heat radiating and deflecting structure may comprise a cone shaped structure 22 made up of a plurality of superimposed fire bricks, preferably circular bricks backed up with straights, with every fourth course of the brick being a header course and the other stringer courses. The refractory cone 22 may be provided with a suitable coating 23, such for instance, as a coating made from a mixture of air setting cements and crushed fire brick. The top or apex of the refractory cone 22 may be provided with an opening 24, the center of which is in line with the center of the burner arrangement. It will thus be seen that the hot products of combustion passing downwardly through the furnace strike the refractory cone 22, the hot products of combustion imparting considerable heat thereto and being deflected outwardly thereby towards the tubes 16. The aperture 24 provided in the top of the cone 22 eliminates any great amount of turbulence at this point due to direct impingement of the hot products of combustion, it being evident that part of the hot gases passes through the aperture 24, thus heating the interior of the cone and avoiding any great temperature differential between the interior and exterior surfaces of the cone.

Figure 2:
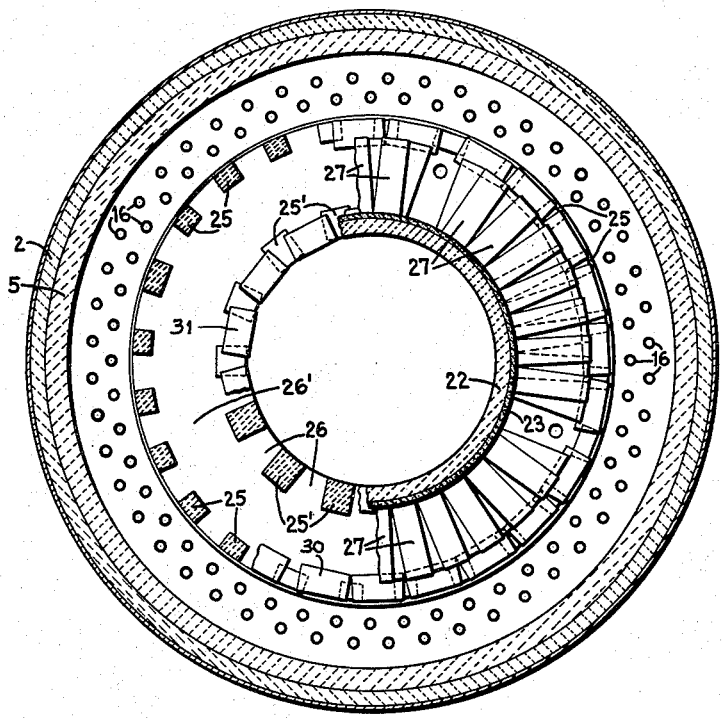
Figure 2 is a plan view taken along the lines 2—2 of Figure 1.

The refractory cone may rest upon a group of piers 25', made up of fire brick depending from the base of the cone 22 to the floor of the furnace. The piers 25' may be spaced from each other thereby providing a plurality of openings or passages 26 for permitting the combustion gases to be withdrawn from the combustion chamber, as will be explained. A skirt 25 surrounds the refractory piers 25' and is provided with openings or passages similar to the openings or passages 26 between the piers 25'. The openings 26 between adjacent piers and the similar openings in the skirt 25 may be in alignment, or if desired, may be staggered, as shown in Fig. 1. A space 26' is provided between the piers 25' and the skirt 25 and may be closed to direct passage thereinto of combustion gases by a tile cover 27, the outer end of which rests upon the skirt 25, the cover 27 and the skirt 25 abruptly changing the path of the combustion products outwardly and thus enabling intimate contact between them and the lower portion of the individual tubes. The openings or passages provided for the skirt 25 may be closed at the upper end thereof by placing a tile cover 30 over each opening or passage, as shown in Fig. 2. Similarly the openings 26 may be closed at the upper end thereof by placing a tile cover 31 upon adjacent piers 25'. The products of combustion after passing in intimate contact with the lower portion of the individual tubes are then conducted through the openings in the skirt 25 into the space 26' and thence through the openings 26 between the piers 25'. The products of combustion are then passed through a flue 28, provided with a suitable refractory lining 29, into another flue, not shown, for passage through an air preheater, if desired, and thence to the stack of the furnace.

It will thus be seen from the above description that the hot gases passing downwardly through the combustion chamber are deflected outwardly by the refractory cone 22 towards the lower portion of the tubes, the flow of these gases upon reaching the base of the cone being abruptly changed to direct them into intimate contact with the lower portion of the individual tubes surrounding the circular skirt 25. The waste gases after passing in intimate contact with this portion of the tubes are then conducted through the plurality of openings 26 to the flue 28 as before described.

The heat radiating and deflecting structure and the circular skirt 25 may extend upwardly from the bottom of the combustion chamber to any desired height, the preferred height depending upon the heat distribution over the entire tube surface. The entire structure is generally made high enough so that radiation from the top of the cone, normal to the face thereof, will strike the vertical tubes 16 slightly below any observed high metal temperature zone previously located. It has been found that the most satisfactory results may be obtained in constructing furnaces in accordance with this invention to have the heat radiating and reflecting cone and skirt extend upwardly within the combustion chamber to a point about half its height. For instance, a furnace having a combustion chamber of about 24 feet in height from the bottom wall 3 to the top wall 4 may be provided, in accordance with this invention, with a heat radiating and reflecting cone and skirt approximately 11 to 12 feet in height. The circular skirt may extend to a point close to the lower portion of the tubes and is larger in diameter than the base of the cone. For instance the vertical wall of the skirt may be about one foot from the tubes and about eight feet larger is diameter than the base of the cone. It is to be clearly understood that this invention is not limited to any particular dimensions, those given being merely for illustrative purposes and may be varied depending on the particular type of furnace.

While the furnace illustrated is shown as circular in cross-section other shapes may be employed, such as rectangular, without departing from the spirit thereof. It will also be clear that the entire heat radiating and reflecting structure may be suitably suspended from the upper portion of the furnace when applying this invention to an upshot type of furnace.

From the foregoing it will be clear that this invention provides for even heat distribution over the entire tube surface, that portion of the individual tubes surrounding the heat radiating and reflecting cone not only being subjected to radiant heat from the hot products of combustion but also reradiated heat from the refractory cone and partial convective heat by contact with some of the hot gases. The extreme lower portion of these tubes is intimately contacted by the hot products of combustion directed thereto by the circular skirt as well as radiated heat therefrom. That portion of the individual heat absorbing tubes above the heat radiating and reflecting cone is heated preponderantly by radiant heat from the hot products of combustion passing downwardly through the combustion chamber.

While there is shown and described the preferred embodiment of the invention, it is to be understood that this invention is not confined to the precise details of construction herein set forth, by way of illustration, as it is apparent that many changes and variations may be made therein, by those skilled in the art, without departing from the spirit of the invention, or exceeding the scope of the appended claims.

We claim:

1. In a furnace for heating hydrocarbon fluids, a vertically disposed cylindrical combustion chamber, heat absorbing tubes disposed adjacent the vertical wall of the combustion chamber, means at the top of the combustion chamber for producing hot products of combustion for passage downwardly therein, a hollow pedestal at the bottom of the combustion chamber and spaced from the vertical wall thereof, a heat radiating cone flared at the base and mounted on the hollow pedestal in opposed relation to said means for producing hot products of combustion and peripheral ports in the hollow pedestal for removing furnace gases from the combusion chamber.

2. In a furnace for heating hydrocarbon fluids, a vertically disposed cylindrical combustion chamber, heat absorbing tubes disposed adjacent the vertical wall of the combustion chamber, means at the top of the combustion chamber for producing hot products of combustion for passage downwardly therein, a hollow pedestal at the bottom of the combustion chamber and spaced from the vertical wall thereof, a hollow heat radiating cone flared at the base, formed with an opening at the apex and mounted on the hollow pedestal in opposed relation to said means for producing hot products of combustion and peripheral ports in the hollow pedestal for removing furnace gases from the combustion chamber.

WILLIS S. GULLETTE.
THOMAS B. KIMBALL.